United States Patent
McFall

(12) United States Patent (10) Patent No.: US 6,261,045 B1
(45) Date of Patent: Jul. 17, 2001

(54) TRANSFER SYSTEM WITH ROTARY DUMPER

(76) Inventor: Robert M. McFall, P.O. Box 1282, Clintwood, VA (US) 24228

( * ) Notice: Subject to any disclaimer, the term of this patent is extended or adjusted under 35 U.S.C. 154(b) by 0 days.

(21) Appl. No.: 09/419,952

(22) Filed: Oct. 18, 1999

(51) Int. Cl.$^7$ ................................................. B65G 67/06
(52) U.S. Cl. ........................... 414/397; 414/328; 193/23
(58) Field of Search .................................. 414/216, 301, 414/328, 329, 389, 397; 222/142, 168; 193/3, 23

(56) References Cited

U.S. PATENT DOCUMENTS

| | | | |
|---|---|---|---|
| 2,436,624 | * | 2/1948 | Volk ........................................ 193/23 |
| 2,634,871 | | 4/1953 | Cline et al. . |
| 3,174,607 | * | 3/1965 | Cooper .................................... 193/23 |
| 3,926,289 | * | 12/1975 | Yoshioka et al. ........................ 193/23 |
| 4,065,005 | * | 12/1977 | Mahle et al. ............................ 414/397 |
| 4,284,380 | * | 8/1981 | Brumbaugh, Jr. et al. ............ 414/329 |
| 4,697,686 | * | 10/1987 | West ........................................ 193/23 |
| 5,415,512 | * | 5/1995 | Buchfink ................................ 414/328 |
| 5,803,695 | * | 9/1998 | Schlagel ................................. 414/301 |

FOREIGN PATENT DOCUMENTS

643408 * 1/1979 (SU) ..................................... 414/329

* cited by examiner

*Primary Examiner*—James W. Keenan
(74) *Attorney, Agent, or Firm*—Michael E. McKee

(57) ABSTRACT

A material transfer system for transferring a material from a source to an open-topped receptacle wherein the material is capable of gravitationally flowing from a source utilizes a circular, rotary dumper having a plurality of open-topped compartments which extend radially from the vertical center axis of the dumper to the outer periphery thereof and a port-defining bottom within each of dumper compartment through which the contents of the compartment can be discharged. The dumper is supported for rotation about its vertical center axis, and a motor is adapted to rotate the dumper about the vertical center axis so that on one side of the vertical center axis of the dumper, the open tops of the compartments are movable into and out of vertical registry with material flowing therein from a source and so that on the opposite side of the vertical center axis of the dumper, the ports of the compartments are movable into and out of vertical registry with an open-topped receptacle to be filled from the dumper. Associated with each compartment port is a closure permitting the ports to be selectively opened and closed so that discharge of material from each compartment is prevented when its port is not positioned in vertical registry with an open-topped receptacle to be filled from the dumper and so that discharge of material from each compartment is permitted when its port is positioned in vertical registry with an open-topped receptacle to be filled from the dumper.

16 Claims, 3 Drawing Sheets

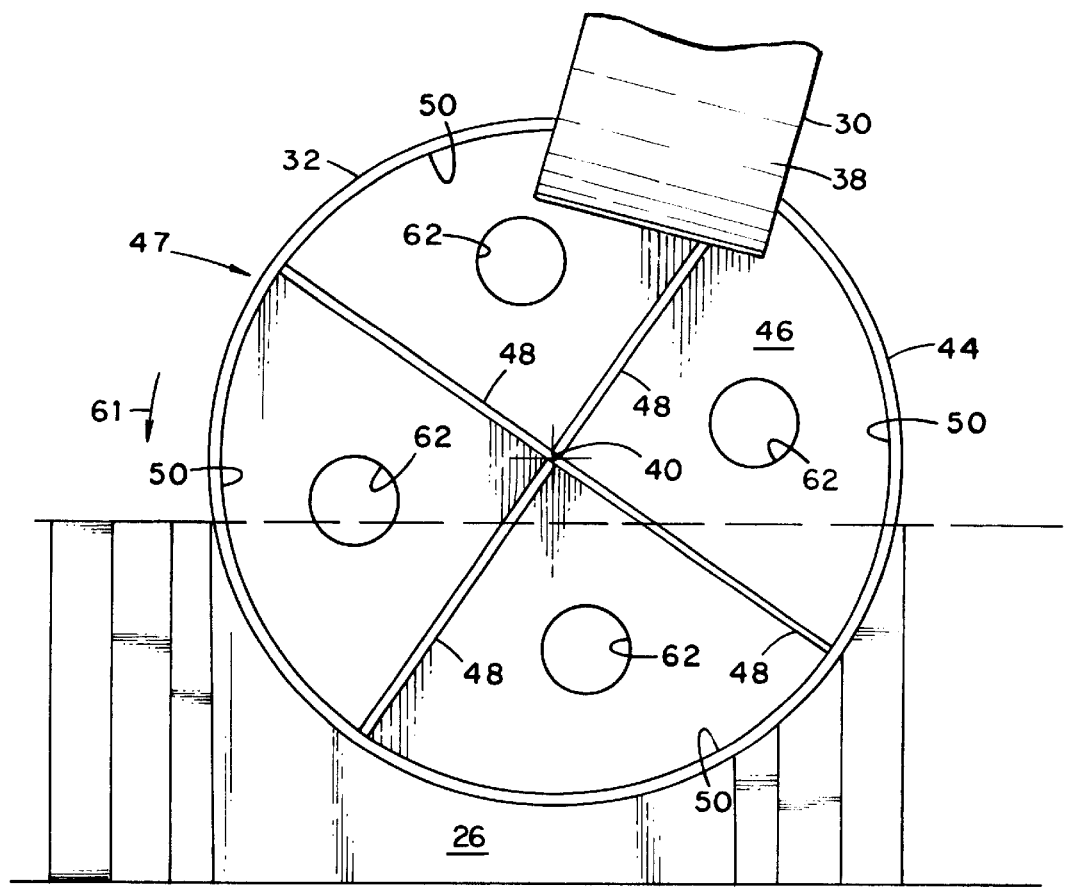
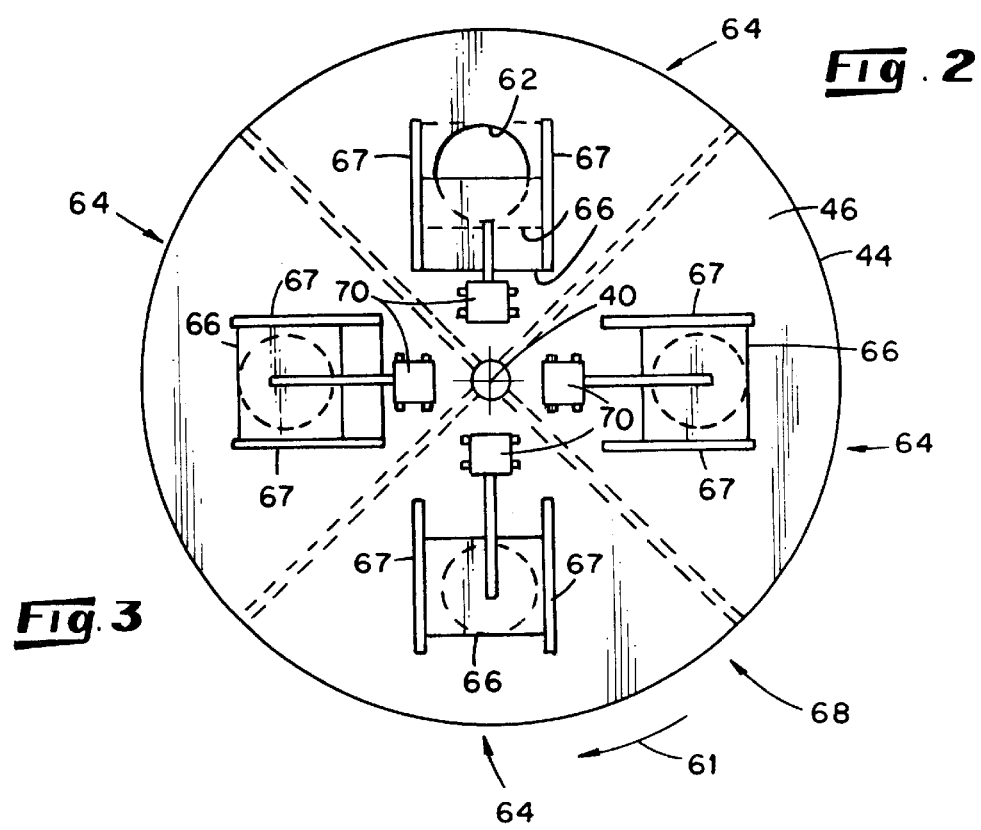
Fig. 2
Fig. 3

TRANSFER SYSTEM WITH ROTARY DUMPER

BACKGROUND OF THE INVENTION

This invention relates generally to loading systems used for loading a fluid-like substance, such as crushed coal or other particulate material or liquids, into transport receptacles, such as intermediary dumper cars designed to load railroad cars, and more particularly, is concerned with such systems which are capable of loading transport receptacles while such receptacles are either stationary or in motion.

To enhance the flexibility and speed of a loading operation utilizing a fixed load point, it would be desirable to provide means for such a loading system which is capable of being interposed between the fixed load point and transport receptacles to be loaded for providing a moving load point.

Accordingly, it is an object of the present invention to provide new and improved means for transferring a fluid-like substance from a fixed load point to a transport receptacle.

Another object of the present invention is to provide such a means which is uncomplicated in construction yet effective in operation.

SUMMARY OF THE INVENTION

This invention resides in a material transfer system for transferring a material from a source to an open-topped receptacle wherein the material is capable of gravitationally flowing from a source.

The transfer system includes an open-topped dumper having an interior, an outer periphery which is substantially circular in form as the open top of the dumper is viewed downwardly theretoward so that the dumper is provided with a vertical center axis, and divider means for separating the interior of the dumper into open-topped compartments. Each compartment has a discharge port through which the contents of the compartment can be discharged.

The system further includes means for supporting the dumper for rotation about the vertical center axis of the dumper and means for rotating the dumper about the vertical center axis so that on one side of the vertical center axis of the dumper, the open tops of the compartments are movable into and out of vertical registry with material flowing therein from a source and so that on the opposite side of the vertical center axis of the dumper, the ports of the compartments are movable into and out of vertical registry with an open-topped receptacle to be filled from the dumper. Also associated with the dumper are means for selectively opening and closing the ports of the compartments so that discharge of material from each compartment is prevented when its port is not positioned in vertical registry with an open-topped receptacle to be filled from the dumper and so that discharge of material from each compartment is permitted when its port is positioned in vertical registry with an open-topped receptacle to be filled from the dumper.

BRIEF DESCRIPTION OF THE DRAWINGS

FIG. 2 is a top view of a fragment of the FIG. 1 loading system.

FIG. 3 is a bottom view of the rotary dumper of the FIG. 1 system.

DETAILED DESCRIPTION OF THE ILLUSTRATED EMBODIMENTS

Figure 1:
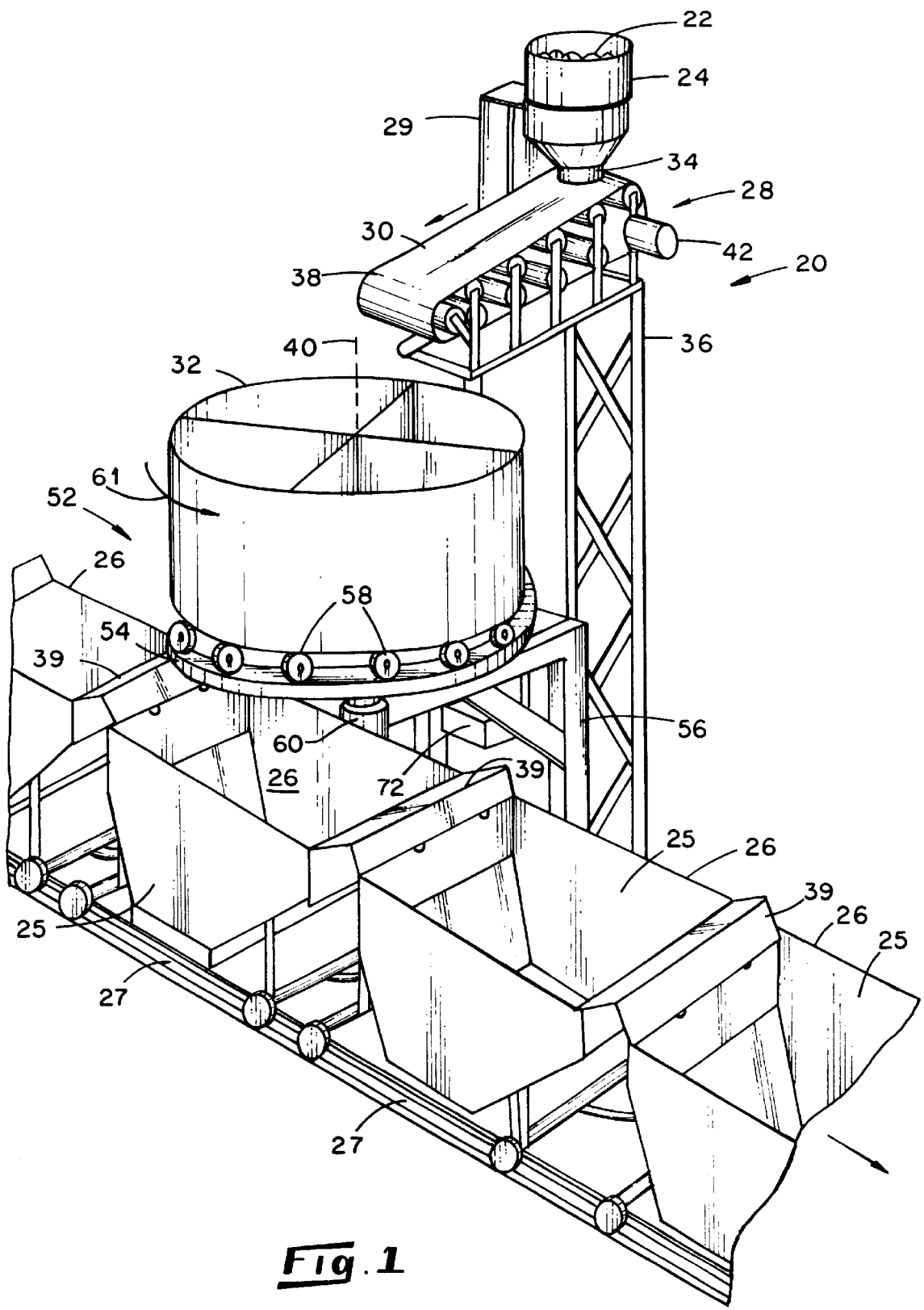
FIG. 1 is a perspective view of a coal-loading system within which an embodiment of a rotary dumper is utilized.

Turning now to the drawings in greater detail, there is shown in FIG. 1 a loading system, generally indicated 20, for transferring particulate material 22 from a source to a plurality of open-topped receptacles for transport. In the depicted FIG. 1 environment, the particulate material 22 is coal, the source is a hopper 24 within which coal is deposited for subsequent discharge, and the open-topped receptacles are track-mounted dumper cars 26 used for transporting the coal to a railroad car (not shown). The loading system 20 includes conveyor means 28 including a movable and endless conveyor belt 30 onto which coal is discharged from the hopper 24 and an open-topped rotary dumper 32 for accepting coal which falls from the end of the conveyor belt 30 and transferring the accepted coal to the dumper cars 26. As will be apparent herein, although each of hopper 24 and conveyor means 28 provide fixed load points from which coal is permitted to gravitationally fall (onto either the conveyor belt 30 or into the rotary dumper 32), the rotary dumper 32 provides a moving load point from which coal is permitted to fall into the dumper cars 26.

With reference still to FIG. 1, the hopper 24 is supported in an elevated position above the conveyor means 28 by means of suitable framework 29 and includes a closable discharge chute 34 which is disposed at one end of the conveyor means 28. The conveyor belt 30 of the conveyor means 28 is suitably supported by a frame 36 (including conveyor rollers) and includes an upper belt run 38 which extends along the length of the frame 36 from a point disposed directly beneath the discharge chute 34 to a point offset to one side of the vertical center axis 40 of the rotary dumper 32 (as best shown in FIG. 2). The conveyor means 28 also includes motive means 42 (FIG. 1) which are connected in driving relationship to the belt 30 so that actuation of the motive means 42 moves the upper belt run 38 from the hopper-end of the run 38 toward the opposite rotary dumper-end of the run 38. It follows therefore that the upper run 38 of the conveyor belt 30 is supported at an elevation which is higher than that of the top of the rotary dumper 32 and that coal which is deposited onto the upper belt run 38 from the hopper 24 is transported by the conveyor belt 30 toward and off of the end of the upper belt run 38 into the top of the rotary dumper 32.

The dumper cars 26 into which the coal is deposited from the conveyor belt 30 include track-mounted wheeled carriages 27 which are connected together in a segmented line and an open-topped hopper body 25 for accepting coal deposited therein from the conveyor belt 30. The dumper cars 26 are moved in a line directly beneath a region of the rotary dumper 32 which is diametrically opposite the side of the rotary dumper 32 into which the coal is being deposited from the conveyor belt 30, as best shown in FIG. 2. Preferably, divider partitions 39 are attached to the dumper cars 26 so as to span the space therebetween to prevent coal from falling into the spacing defined between adjacent dumper cars 26.

With reference to FIGS. 2 and 3, the rotary dumper 32 is substantially circular in form (as viewed from the top, as in FIG. 2) having arcuate peripheral sidewalls 44 along its periphery and a bottom 46. The dumper 32 also includes divider means 47 for separating the interior of the dumper 32 into a plurality of compartments capable of holding coal deposited therein from the upper belt run 38. In the depicted rotary dumper 32, the divider means 47 are in the form of wall-like partitions 48 which divide the interior of the dumper 32 into four equal-sized compartments 50 which extend radially outwardly of the vertical center axis 40 of the dumper 32 to the peripheral sidewalls 44, and the bottom 46 of each compartment 50 is funnel-shaped with the apex of the funnel-shape directed downwardly to facilitate gravitational flow of material therethrough.

With reference again to FIG. 1, there is associated with the rotary dumper 32 means, generally indicated 52, for supporting the rotary dumper 32 for rotation about its vertical center axis 40. A portion of such means 52 is in the form of a circular frame 54 which is suitably supported in an elevated condition above the dumper cars 26 by means of a support frame 56 and track-mounted wheels 58 which are interposed between the bottom of the dumper 32 (and along the periphery thereof) and the circular frame 54 in a manner which permits the dumper 32 to be rotated about the vertical center axis 40. For moving the rotary dumper 32 about the axis 40, there is provided a motor 60 which is disposed beneath the dumper 32 and suitably connected in driving relationship with the dumper 32 so that actuation of the motor 60 forces the dumper 32 to rotate about the axis 40. In the depicted loading system 20, the rotary dumper 32 is adapted to rotate in the direction of the FIG. 2 arrow 61.

With reference again to FIGS. 2 and 3, it is a feature of the loading system 20 that its rotary dumper 32 is adapted to discharge the contents of its compartments 50 as each compartment 50 moves across the line of dumper cars 26 so that the discharged contents (i.e. coal) is collected within the dumper cars 26. To this end, the floor the each compartment 50 is provided with a port 62, and there is associated with each port 62 a closure means 64 for selectively opening and closing the port 62 to either permit the coal contents of each compartment 50 to be discharged from the dumper 32 or to shut off (and thus prevent) the flow of coal from the compartment 50. As will be apparent herein, each compartment port 62 is in an opened condition as it passes directly across the line of dumper cars 26 and is in a closed condition when it is not moving across the line of dumper cars 26. Consequently, each compartment 50 is capable of being filled with coal deposited therein from the conveyor belt 30 while coal is prevented from falling through the port 62.

In the depicted rotary dumper 32, each compartment port 62 is round in shape, and each closure means 64 includes a flat plate 66 which is mounted between a pair of guideways 67 disposed along the opposite sides of the port 62 enabling the plate 66 to be slidably moved across the port 62. The closure means 64 also includes moving means 68 for moving the plate 66 back and forth across the port 62 to open and close the port 62. Although the moving means 68 can take any of a number of forms, the depicted moving means 68 includes a reversible stepping motor 70 having a shaft which is suitably connected to the plate 66 so that actuation of the motor 70 in one rotational direction moves the plate 66 in one direction across the port 62 to uncover (and thus open) the port 62, and so that actuation of the motor 70 in the opposite rotational direction moves the plate 66 in the opposite direction across the port 62 to thereby cover (and thus close) the port 62.

As mentioned above, coal is permitted to be discharged from each port 62 as the port 62 passes across the line of dumper cars 26 yet is closed as the port 62 is not being moved across the dumper car line. To coordinate the actuation (and direction of rotation) of the motors 70, there is provided a control computer 72 (FIG. 1) mounted adjacent the dumper 32 and appropriately wired to the motors 70 which monitors the loading operation and sequences the opening and closing of the ports 62 during the rotation of the dumper 32 so that the ports 62 are closed and remain closed during any period of time at which the port 62 is not directly over the line of dumper cars and so that the port 62 is in an open condition only during the period of time that the port 62 is disposed directly above (i.e. is in vertical registry with) the line of dumper cars 26. To ensure that no portion of a port 62 is in an opened condition as it moves out of vertical registry with the dumper car line, the control computer 72 initiates the closing of the port 62 as the port 62 is still in registry with the dumper car line so that the closing of the port 62 is complete by the time that the port 62 moves out of registry with the dumper car line. Similarly, a port-opening operation is not initiated until the entirety of the port 62 is moved into vertical registry with the dumper car line.

The operation of the loading system 20 can be summarized as follows. Coal is deposited from the hopper 24 onto one end of the upper run 38 of the conveyor belt 30, and then the coal is transported by the conveyor belt 30 to the opposite end of the upper belt run 38 where it is deposited into the open top of the rotary dumper 32 as the dumper 32 is rotated about its vertical center axis 40. Because coal which falls off of the upper belt run 38 into the rotary dumper 32 falls into a dumper compartment 50 having its port 62 in a closed condition, coal is permitted to accumulate within that compartment 50 during the period of time that the compartment 50 remains in vertical registry with the end of the upper belt run 38. However, as soon as the continued rotation of the dumper 32 moves the compartment 50 into vertical registry with the line of dumper cars 26, the compartment port 62 is opened so that the coal in the compartment falls downwardly therethrough toward the dumper car line for collection within the dumper cars 26.

It follows that since the rotary dumper 32 includes a plurality of (i.e. four) compartments 50, at least one dumper compartment 50 is being filled with coal while at least another dumper compartment 50 is being emptied of coal. Consequently, coal is continuously in motion as it moves between the upper belt run 38 and the line of dumper cars 26 so that speed of a coal loading operation is not adversely affected by the presence of the dumper 32. To the contrary, since the compartment ports 62 are in motion (and move in a direction along the dumper car line which corresponds generally to the direction of movement of the dumper cars along the line) so as to provide a moving load point disposed above the dumper car line, it may be desirable to maintain the dumper cars 26 in motion as they move beneath the dumper 32 and thus enhance the speed of a dumper car-loading operation.

Figure 4:
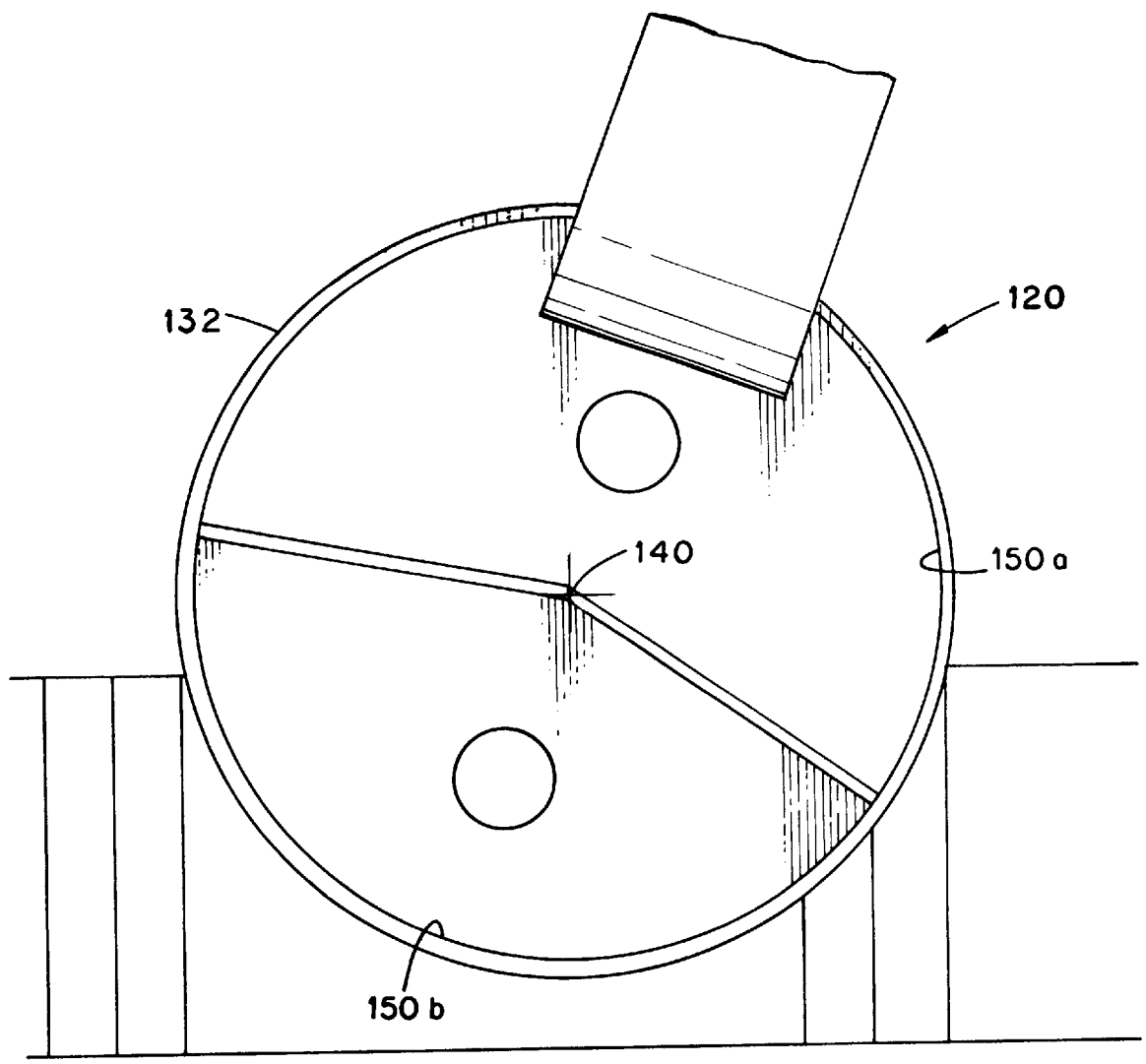
FIG. 4 is a top view, similar to that of FIG. 2, of a coal-loading system within which an alternative embodiment of a rotary dumper is utilized.

It follows from the foregoing that numerous modifications can be made to the aforedescribed embodiments without departing from the spirit of the invention. For example, although the aforedescribed rotary dumper 32 has been described as including four equally-sized compartments 50 which are regularly spaced along the periphery of the dumper sidewalls 44, a dumper 32 in accordance with the present invention can have an alternative number (e.g. two or more) of compartments, and such compartments can be of unequal size. For example, there is illustrated in FIG. 4 an alternative coal-loading system 120 having a rotary dumper 132 (rotatable about a vertical axis 140) provided with two compartments 150a and 150b of unequal size. Accordingly, the aforedescribed embodiments are intended for the purpose of illustration and not as limitation.

What is claimed is:

1. A material transfer system for transferring a material from a source to an open-topped receptacle wherein the material is capable of gravitationally flowing from a source, the transfer system comprising:

an open-topped dumper having an interior, an outer periphery which is substantially circular in form as the open top of the dumper is viewed downwardly theretoward so that the dumper is provided with a vertical center axis, and divider means for separating the interior of the dumper into open-topped compartments, and each compartment having a discharge port through which the contents of the compartment can be discharged;

means for supporting the dumper for rotation about the vertical center axis of the dumper;

means for rotating the dumper about the vertical center axis so that on one side of the vertical center axis of the dumper, the open tops of the compartments are movable into and out of vertical registry with material flowing therein from a source and so that on the opposite side of the vertical center axis of the dumper, the ports of the compartments are movable into and out of vertical registry with an open-topped receptacle to be filled from the dumper; and means for selectively opening and closing the ports of the compartments so that discharge of material from each compartment is prevented when its port is not positioned in vertical registry with an open-topped receptacle to be filled from the dumper and so that discharge of material from each compartment is permitted when its port is positioned in vertical registry with an open-topped receptacle to be filled from the dumper.

2. The system as defined in claim 1 wherein the compartments of the rotary dumper are of equal size.

3. The system as defined in claim 1 wherein the compartments of the rotary dumper are of unequal size.

4. The system as defined in claim 1 wherein the dumper includes at least two compartments which are spaced along the periphery of the dumper.

5. The system as defined in claim 1 wherein the means for selectively opening and closing the compartment ports includes a plate which is movable across the opening of each port.

6. The system as defined in claim 1 wherein the means for rotating the dumper about the vertical center axis includes a motor.

7. The system as defined in claim 1 wherein the divider means includes partition means which extend radially outwardly of the vertical center axis of the dumper to the outer periphery thereof.

8. The system as defined in claim 1 wherein the material to be transferred from the source to an open-topped receptacle is coal and the open-topped receptacle is a transport receptacle for conveying the coal to a railway car.

9. A material transfer system for transferring a material from a source to an open-topped receptacle wherein the material is capable of gravitationally flowing from a source and falls along a vertical path as it moves between the source and the open-topped receptacle, the transfer system comprising:

an open-topped dumper having an interior, an outer periphery which is substantially circular in form as the open top of the dumper is viewed downwardly theretoward so that the dumper is provided with a vertical center axis, and divider means for separating the interior of the dumper into open-topped compartments, and each compartment has a discharge port through which the contents of the compartment can be discharged;

means for supporting the dumper for rotation about the vertical center axis of the dumper and so that the vertical path along which the material falls from a source directs material into the dumper and is offset to one side of the vertical center axis of the dumper and so that the region of the dumper disposed substantially diametrically opposite the side of the dumper into which material is directed is disposed in vertical registry with the open-topped receptacle into which the material is transferred from the dumper;

means for rotating the dumper about the vertical center axis so that on one side of the vertical center axis of the dumper, the open tops of the compartments are movable into and out of vertical registry with material flowing therein from the source and so that on the opposite side of the vertical center axis of the dumper, the ports of the compartments are movable into and out of vertical registry with the open-topped receptacle to be filled from the dumper; and means for selectively opening and closing the discharge ports of the compartments so that discharge of material from each compartment is prevented when its port is not positioned in vertical registry with an open-topped receptacle to be filled from the dumper and so that discharge of material from each compartment is permitted when its port is positioned in vertical registry with an open-topped receptacle to be filled from the dumper.

10. The system as defined in claim 9 wherein the compartments of the rotary dumper are of equal size.

11. The system as defined in claim 9 wherein the compartments of the rotary dumper are of unequal size.

12. The system as defined in claim 9 wherein the dumper includes at least two compartments which are spaced along the periphery of the dumper.

13. The system as defined in claim 9 wherein the means for selectively opening and closing the compartment ports includes a plate which is movable across the opening of each port.

14. The system as defined in claim 9 wherein the means for rotating the dumper about the vertical center axis includes a motor.

15. The system as defined in claim 9 wherein the divider means includes partition means which extend radially outwardly of the vertical center axis of the dumper to the outer periphery thereof.

16. The system as defined in claim 9 wherein the material to be transferred from the source to an open-topped receptacle is coal and the open-topped receptacle is a transport receptacle for conveying the coal to a railway car.

* * * * *

UNITED STATES PATENT AND TRADEMARK OFFICE
CERTIFICATE OF CORRECTION

PATENT NO.    : 6,262,045 B1
DATED         : July 17, 2001
INVENTOR(S)   : Yannick Evanno et al.

Page 1 of 1

It is certified that error appears in the above-identified patent and that said Letters Patent is hereby corrected as shown below:

Column 23, claim 1,
In the structure for general formula (I),

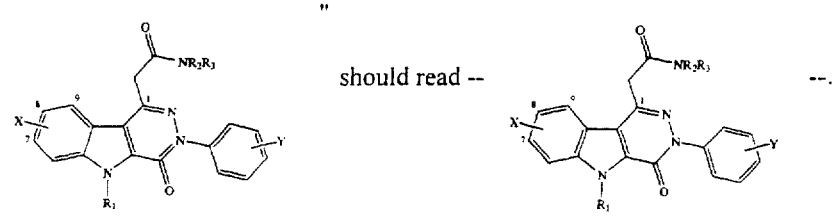

Column 24, claim 5,
Line 31, "syndrom" should read -- syndrome --.

Signed and Sealed this

Second Day of April, 2002

Attest:

JAMES E. ROGAN
*Director of the United States Patent and Trademark Office*

*Attesting Officer*